United States Patent
Murtaza et al.

(10) Patent No.: US 12,509,619 B2
(45) Date of Patent: Dec. 30, 2025

(54) CLAY SWELLING INHIBITION USING ACRYLIC ACID FUNCTIONALIZED CELLULOSE DIACRYLATE CARBON NANOCOMPOSITE

(71) Applicant: KING FAHD UNIVERSITY OF PETROLEUM AND MINERALS, Dhahran (SA)

(72) Inventors: Mobeen Murtaza, Dhahran (SA); Azeem Rana, Lahore (PK); Sohail Nadeem, Lahore (PK); Muhammad Shahzad Kamal, Dhahran (SA); Mohamed Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/047,523

(22) Filed: Feb. 6, 2025

(65) Prior Publication Data
US 2025/0236778 A1 Jul. 24, 2025

Related U.S. Application Data

(60) Provisional application No. 63/662,207, filed on Jun. 20, 2024.

(51) Int. Cl.
*C09K 8/20* (2006.01)

(52) U.S. Cl.
CPC .......... *C09K 8/206* (2013.01); *C09K 2208/10* (2013.01)

(58) Field of Classification Search
None
See application file for complete search history.

(56) References Cited

U.S. PATENT DOCUMENTS

| | | |
|---|---|---|
| 10,442,973 B1 | 10/2019 | Jiang et al. |
| 11,840,662 B2 | 12/2023 | Shanmugam et al. |
| 11,981,857 B1 | 5/2024 | Saleh et al. |

OTHER PUBLICATIONS

Nadeem; "Acrylic Acid-Functionalized Cellulose Diacrylate-Carbon Nanocomposite Thin Film: Preparation, Characterization, and Applications"; JOM (Sustainable Composite Materials); Mar. 14, 2022, 74, p. 2113-2119. (Year: 2022).*

Mobeen Murtaza et al., "Acrylic Acid-Modified Cellulose Nanocomposite: A Promising Green Solution for Shale Inhibition in Water-Based Drilling Fluids", International Petroleum Technology Conference, Feb. 12, 2024, 5 pages.

Mukaila A. Ibrahim et al., "Partially aminated acrylic acid grafted activated carbon as inexpensive shale hydration inhibitor", Carbohydrate Research, vol. 491, Mar. 5, 2020, 107960, 8 pages.

* cited by examiner

*Primary Examiner* — Andrew Sue-Ako
(74) *Attorney, Agent, or Firm* — Oblon, McClelland, Maier & Neustadt, L.L.P.

(57) ABSTRACT

A method of clay swelling inhibition includes contacting an aqueous drilling fluid with a subterranean geological formation. The aqueous drilling fluid includes an acrylic acid functionalized cellulose diacrylate carbon nanocomposite (AA-Cellulose-NC) material in an amount of 0.1 to 2 percent by weight (wt. %) of the aqueous drilling fluid. The AA-Cellulose-NC material is deposited on and binds to an inner surface of the subterranean geological formation to form a hydrophobic filter cake layer to reduce swelling of clay in the subterranean geological formation.

19 Claims, 11 Drawing Sheets

CLAY SWELLING INHIBITION USING ACRYLIC ACID FUNCTIONALIZED CELLULOSE DIACRYLATE CARBON NANOCOMPOSITE

CROSS REFERENCE TO RELATED APPLICATION

This application claims the benefit of U.S. Provisional Application No. 63/622,207, filed Jun. 20, 2024, which is incorporated herein by reference in its entirety.

STATEMENT REGARDING PRIOR DISCLOSURE BY THE INVENTORS

Aspects of the present disclosure are described in Nadeem, S. et al., "Synthesis and Application of an Eco-Friendly Cellulose Diacrylate-Carbon Nanocomposite: A Highly-Effective Inhibitor for Clay Swelling in Water-Based Drilling" published in Volume 49, Arabian Journal for Science and Engineering (2024), which is incorporated herein by reference in its entirety.

BACKGROUND

Technical Field

The present disclosure is directed to a method of clay swelling inhibition using an acrylic acid functionalized cellulose diacrylate carbon nanocomposite (AA-Cellulose-NC).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Clay swelling is a common problem encountered during oil and gas exploration. When drilling fluids contact clay minerals in the subsurface, the clay and clay minerals can absorb water and expand, leading to reduce permeability and productivity of the reservoir. Clay swelling inhibitors are widely used to prevent clay swelling. Conventional clay inhibitors, such as potassium chloride, quaternary ammonium salts, and inorganic salts, are commonly employed in the oil drilling industry; however, their poor efficiency, low stability, and environmental issues limit their applications. Utilization of nanocomposites for clay swelling inhibition offers several advantages over conventional inhibitors owing to features such as large surface area, better mechanical properties, and higher stability. Nanocomposites can be formed by the dispersion of nanoparticles (NPs) in a polymer matrix.

In U.S. Ser. No. 11/840,662B2, a drilling fluid composition that includes a base fluid and a shale inhibitor made from an ultra-high molecular weight branched block copolymer consists of various monomers for enhanced stability. The copolymer's structure aims to improve performance by effectively preventing shale expansion and ensuring wellbore stability during drilling operations. A drawback of this drilling fluid composition is the complex synthesis of the ultra-high molecular weight branched block copolymer, which may raise production costs and hinder scalability. Further, lack of stability and effectiveness under varying drilling conditions could shows operational challenges.

Although several nanocomposites have been developed in the past for clay swelling inhibition, there still exists a need to fabricate and explore more efficient materials that may circumvent drawbacks of the current art.

SUMMARY

In an exemplary embodiment, a method of clay swelling inhibition is described. The method includes contacting an aqueous drilling fluid with a subterranean geological formation. The aqueous drilling fluid includes an acrylic acid functionalized cellulose diacrylate carbon nanocomposite (AA-Cellulose-NC) material in an amount of 0.1 to 2 percent by weight (wt. %) of the aqueous drilling fluid. The AA-Cellulose-NC material is deposited on and binds to an inner surface of the subterranean geological formation to form a hydrophobic filter cake layer to reduce swelling of clay in the subterranean geological formation.

In some embodiments, the swelling of the clay is reduced by 35 to 60% by volume compared to the subterranean geological formation contacted with an aqueous fluid that is the same as the aqueous drilling fluid but does not contain the AA-Cellulose-NC material.

In some embodiments, a fluid loss decreases 20 to 30% by volume compared to the subterranean geological formation contacted with the aqueous fluid that is the same as the aqueous drilling fluid but does not contain the AA-Cellulose-NC material.

In some embodiments, the aqueous drilling fluid further includes a bentonite, a base, a polymer, a starch, and a barite.

In some embodiments, the bentonite is a sodium bentonite (Na-Ben).

In some embodiments, the aqueous drilling fluid has a plastic viscosity (PV) 3 to 4 times greater than an aqueous fluid that is the same as the aqueous drilling fluid but does not contain the AA-Cellulose-NC material.

In some embodiments, the aqueous drilling fluid includes an AA-Cellulose-NC material in an amount of 0.2 wt. % and swelling of the clay is reduced by 36 to 38% compared to an aqueous fluid that is the same as the aqueous drilling fluid but does not contain the AA-Cellulose-NC material.

In some embodiments, the aqueous drilling fluid includes an AA-Cellulose-NC material in an amount of 0.5 wt. % and swelling of the clay is reduced by 45 to 48% compared to an aqueous fluid that is the same as the aqueous drilling fluid but does not contain the AA-Cellulose-NC material.

In some embodiments, the aqueous drilling fluid includes an AA-Cellulose-NC material in an amount of 1 wt. % and swelling of the clay is reduced by 55 to 59% compared to an aqueous fluid that is the same as the aqueous drilling fluid but does not contain the AA-Cellulose-NC material.

In another exemplary embodiment, a method of making AA-Cellulose-NC is described. The method includes mixing cellulose, an alkyl polyethylene glycol ether, and ammonium persulfate in water to form a first solution and mixing acrylic acid, methyl methacrylate, and 2-ethyl hexyl acrylate with the first solution to form a second solution. The method includes heating the second solution to a temperature of 80 to 90 degrees Celsius (° C.) for 20 to 40 minutes (min). Subsequently, the method includes adding carbon nanoparticles (CNPs) to the second solution to form a third solution. Further, the method includes sonicating the third solution and heating the third solution to a temperature of 80 to 90° C. for 50 to 70 min to form the AA-Cellulose-NC material.

In some embodiments, the CNPs are obtained from a millet carbon soot.

In some embodiments, the aqueous drilling fluid retains a thermal stability value of 85 to 90% at 1000° C. compared to a thermal stability value at 30° C.

In some embodiments, the aqueous drilling fluid has a yield point (YP) 1.5 to 2.5 times greater than an aqueous fluid that is the same as the aqueous drilling fluid but does not contain the AA-Cellulose-NC material.

In some embodiments, the aqueous drilling fluid has a ratio of YP to PV (YP/PV) 0.4 to 0.6 times less than an aqueous fluid that is the same as the aqueous drilling fluid but does not contain the AA-Cellulose-NC material.

In some embodiments, at 10 seconds (s), the aqueous drilling fluid has a gel strength 1.3 to 1.7 times greater than an aqueous fluid that is the same as the aqueous drilling fluid but does not contain the AA-Cellulose-NC material.

In some embodiments, at 10 min, the aqueous drilling fluid has a gel strength 1.4 to 1.8 times greater than an aqueous fluid that is the same as the aqueous drilling fluid but does not contain the AA-Cellulose-NC material.

In some embodiments, the contacting occurs at a temperature of 70 to 80° C.

In some embodiments, the AA-Cellulose-NC material includes reacted units of a cellulose, reacted units of a methyl methacrylate, reacted units of an acrylic acid, and reacted units of a 2-ethyl hexyl acrylate.

In some embodiments, the hydrophobic filter cake layer has a thickness of 0.1 to 50 micrometers (μm).

In some embodiments, a mass ratio of the bentonite to the AA-Cellulose-NC material is from 5:1 to 55:1.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
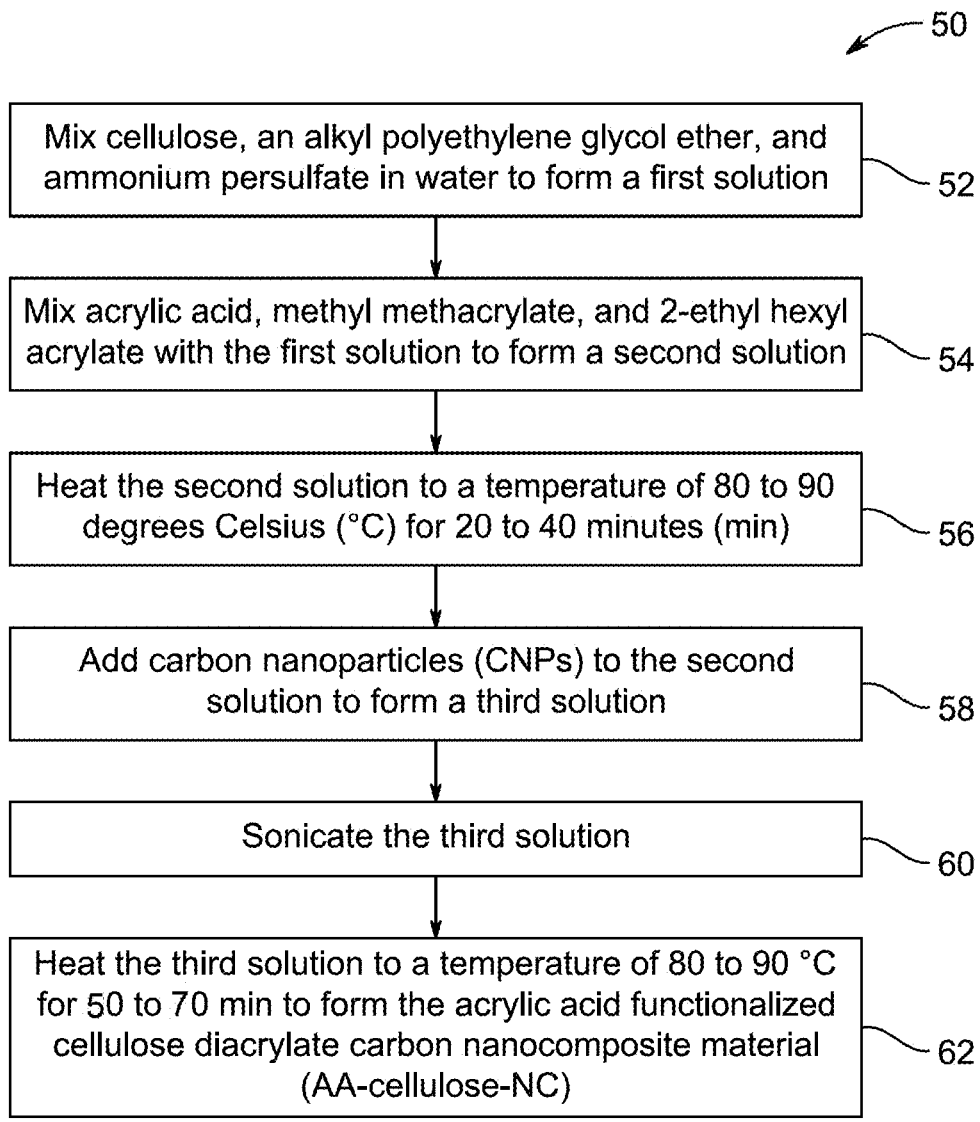
FIG. 1 is a method flow chart for synthesizing an acrylic acid functionalized cellulose diacrylate carbon nanocomposite (AA-Cellulose-NC), according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "particle" refers to an object that acts as a whole unit regarding its transport and properties.

As used herein, the terms "particle size" may be thought of as the length or longest dimension of a particle. The greatest distance that can be measured from one point on a shape through its center to a point directly across from it is referred to as the "diameter" for a circle, oval, ellipse, and multilobe. Particle size may be measured through techniques such as dynamic light scattering (DLS) and/or scanning electron microscopy (SEM).

As used herein, "nanoparticles (NPs)" refers to particles having a particle size of 1 nanometer (nm) to 500 nm within the scope of the present disclosure.

As used herein, the term "compound" refers to a chemical entity, regardless of its phase (solid, liquid, or gas), as well as its state (crude mixture, purified, or isolated).

As used herein, the term "room temperature" refers to a temperature range of 25 degrees Celsius (° C.)±3° C.

As used herein, the term "ultrasonication" or "sonication" refers to the process in which sound waves are used to agitate particles in a solution.

As used herein, the term "calcination" refers to heating a compound to a high temperature under a restricted supply of ambient oxygen. This is performed to remove impurities or volatile substances and to incur thermal decomposition.

As used herein, the term "pore" refers to a small opening or space in a material, such as rock or soil, through which fluids or gases can pass.

As used herein, the term "porosity" refers to a measure of the void spaces in a material, typically expressed as a percentage of the total volume.

As used herein, the term "filtration" refers to a mechanical or physical operation that can be employed for the separation of constituents of homogeneous or heterogeneous solutions.

As used herein, the term "subterranean geological formation" refers to a large-scale geological feature that exists beneath the Earth's surface.

As used herein, the term "drilling fluid" refers to a mixture of chemicals, clay, oil, and/or water that is circulated around a drill bit during oil and gas drilling. In the present disclosure, "drilling fluid," "drilling mud," and "base mud (BM)" may be used interchangeably.

As used herein, the term "aqueous drilling fluid" refers to a drilling fluid in which water is the primary continuous phase (i.e., at least 51 percent by weight or volume). In the present disclosure, "aqueous drilling fluid" and "water-based mud (WBM)" may be used interchangeably.

As used herein, the term "rheological properties" refers to material properties that describe how a material deforms or flows at the application of a force or stress.

As used herein, the term "clay swelling" refers to an increase in volume of clay particles due to water absorption which affects their physical and mechanical properties. Two types of swelling can occur in clay, including inner crystalline swelling, which is caused by the hydration of the exchangeable cation of the dry clay, and osmotic swelling, which results from the large difference in the ion concentrations close to the clay surfaces and in pore water.

As used herein, the term "shale" refers to materials such as sedimentary rock that is made up of clay minerals (for example, bentonite) and other minerals, like quartz and calcite, and related subterranean materials that may "swell," or increase in volume, when exposed to water. Reactive shales can pose challenges during drilling operations due to their tendency to deteriorate when in contact with aqueous media, such as water-based drilling fluids. This degradation, including swelling, can create unfavorable drilling conditions and interfere with the effectiveness of the drilling fluid.

As used herein, the term "clay swelling inhibition" refers to the use of chemicals or treatments to reduce the volume increase of clay when it absorbs water to enhance stability and performance.

As used herein, the term "shear" refers to the stress(es) used to cause fluid(s) to flow or change form and response(s) of the fluid(s).

As used herein, the term "shear rate" refers to the rate at which a material is deformed due to a velocity gradient. Shear rate is a gradient of velocity in a flowing material.

As used herein, the term "hydrophobic filter cake layer" refers to a thin, water-repellent coating that accumulates on a surface of a wellbore during drilling or filtration processes, preventing fluid incursion and protecting the formation. It may be caused by the interaction of hydrophobic elements in the drilling fluid with the wellbore surface.

As used herein, the term "plastic viscosity (PV)" refers to a resistance of a drilling fluid to flow, which reflects its internal friction, when exposed to shear, preferably according to API Specification 13A/ISO 13500.

As used herein, the term "yield point (YP)" refers to a minimum amount of stress needed to initiate the flow of a drilling fluid, preferably according to API Specification 13A/ISO 13500.

As used herein, the term "fluid loss" refers to hydraulic conductivity, typically measured in milliliters (mL) per unit time, most commonly "mL per 30 minutes" when referring to measuring fluid loss in drilling muds; essentially, the volume of fluid that filters through a specified membrane over a 30-minute period, preferably according to ASTM D5891/D5891M-19.

A weight percent of a component, unless specifically stated to the contrary, is based on a total weight of the formulation and/or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to an acrylic acid functionalized cellulose diacrylate carbon nanocomposite (AA-Cellulose-NC) and its application as a fluid loss controller and a shale swelling inhibitor in aqueous drilling muds. The inhibition potential was assessed by employing linear swelling techniques. AA-Cellulose-NC is observed to be efficient as a clay inhibition additive for water-based mud (WBM). It is an eco-friendly alternative for enhancing wellbore stability and reducing non-productive time in drilling operations.

According to a first aspect of the present disclosure, a method of clay swelling inhibition is described. The method includes contacting an aqueous drilling fluid with a subterranean geological formation. In some embodiments, the aqueous drilling fluid is contacted with the subterranean geological formation at a temperature of 70 to 80° F., preferably 71 to 79° F., preferably 72 to 78° F., preferably 73 to 77° F., more preferably 74 to 76° F., and yet more preferably about 75° F.

A drilling fluid or base mud (BM) should circulate throughout the well to transport cuttings from beneath the bit up the annulus and facilitate their separation at the surface. The drilling fluid is also responsible for cooling and cleaning the drill bit, reducing friction between the drill string and the sides of the borehole, and ensuring stability in uncased sections. Furthermore, the drilling fluid may create a thin, low-permeability filter cake that seals openings in formations penetrated by the bit, helping to minimize the unwanted influx of formation fluids from permeable rocks.

Drilling fluids or BMs are typically classified based on the base material or primary continuous phase. Because of environmental concerns, attention has shifted to water-based muds (WBMs) or aqueous drilling fluids. WBMs typically contain three types of solids: (1) clays and organic colloids added to provide viscosity and filtration properties, (2) heavy minerals that increase the density of the drilling fluid, and (3) formation solids dispersed in the drilling fluid during the drilling operation.

The aqueous drilling fluid includes an acrylic acid functionalized cellulose diacrylate carbon nanocomposite (AA-Cellulose-NC) material in an amount of 0.1 to 2 percent by weight (wt. %), preferably 0.2 to 1.9 wt. %, preferably 0.3 to 1.8 wt. %, preferably 0.4 to 1.7 wt. %, preferably 0.5 to 1.6 wt. %, preferably 0.6 to 1.5 wt. %, preferably 0.7 to 1.4 wt. %, preferably 0.8 to 1.3 wt. %, preferably 0.9 to 1.2 wt. %, and preferably 1.0 to 1.1 wt. % of the aqueous drilling fluid. In an embodiment, the aqueous drilling fluid include the AA-Cellulose-NC material in an amount of about 0.2 wt. % of the aqueous drilling fluid. In another embodiment, the aqueous drilling fluid include the AA-Cellulose-NC material in an amount of about 0.5 wt. % of the aqueous drilling fluid.

In yet another embodiment, the aqueous drilling fluid include the AA-Cellulose-NC material in an amount of about 1 wt. % of the aqueous drilling fluid.

In some embodiments, the AA-Cellulose-NC material includes reacted units of a cellulose, reacted units of a methyl methacrylate, reacted units of an acrylic acid, and reacted units of a 2-ethyl hexyl acrylate. In some embodiments, the AA-Cellulose-NC material may include other reacted units of acrylate including, but not limited to, reacted units of methyl acrylate, reacted units of ethyl acrylate, reacted units of 2-chloroethyl vinyl ether, reacted units of butyl acrylate, and/or reacted units of trimethylolpropane triacrylate. The AA-Cellulose-NC material is deposited on and binds to an inner surface of the subterranean geological formation to form a hydrophobic filter cake layer to reduce swelling of clay in the subterranean geological formation. In some embodiments, the AA-Cellulose-NC material binds to the inner surface of the subterranean geological formation through intermolecular forces, such as London dispersion forces, ion-dipole forces, dipole-dipole forces, and hydrogen bonding.

In some embodiments, the aqueous drilling fluid further includes a bentonite, a base, a polymer, a starch, and a barite. In some embodiments, a mass ratio of the bentonite to the AA-Cellulose-NC material is from 5:1 to 55:1, preferably 6:1 to 54:1, preferably 7:1 to 53:1, preferably 8:1 to 52:1, preferably 9:1 to 51:1, preferably 10:1 to 50:1, preferably 11:1 to 49:1, preferably 12:1 to 48:1, preferably 13:1 to 47:1, preferably 14:1 to 46:1, preferably 15:1 to 45:1, preferably 16:1 to 44:1, preferably 17:1 to 43:1, preferably 18:1 to 42:1, preferably 19:1 to 41:1, preferably 20:1 to 40:1, preferably 21:1 to 39:1, preferably 22:1 to 38:1, preferably 23:1 to 37:1, preferably 24:1 to 36:1, preferably 25:1 to 35:1, preferably 26:1 to 34:1, preferably 27:1 to 33:1, preferably 28:1 to 32:1, and preferably 29:1 to 31:1. In an embodiment, a mass ratio of the bentonite to the AA-Cellulose-NC material in the aqueous drilling fluid is 50:1. In another embodiment, a mass ratio of the bentonite to the AA-Cellulose-NC material in the aqueous drilling fluid is 20:1. In yet another embodiment, a mass ratio of the bentonite to the AA-Cellulose-NC material in the aqueous drilling fluid is 10:1.

Bentonite is a clay mineral that serves as a thickening agent and provides viscosity, which facilitates in suspending cuttings and stabilizing the wellbore. The swelling properties of bentonite also help seal fractures in formations. Bentonite clays may be classified as a sodium bentonite, a calcium bentonite, a potassium bentonite, an aluminium bentonite, an activated bentonite, an organophilic bentonite, a high-shear bentonite, and montmorillonite-rich bentonite clays, such as hectorite and sauconite, each having its own set of qualities for specialized applications. In a preferred embodiment, the bentonite is a sodium bentonite (Na-Ben).

In some embodiments, the base may be included to adjust the pH of the drilling fluid. The base used may be an alkali metal hydroxide, such as sodium hydroxide (NaOH), potassium hydroxide (KOH), lithium hydroxide (LiOH), and rubidium hydroxide (RbOH), or an alkaline earth metal hydroxide, such as beryllium hydroxide (Be(OH)$_2$), magnesium hydroxide (Mg(OH)$_2$), strontium hydroxide (Sr(OH)$_2$), and calcium hydroxide (Ca(OH)$_2$). In a preferred embodiment, the base is NaOH.

In some embodiments, the aqueous drilling fluid further includes a polymer. Polymers may be added to improve the rheological qualities of a fluid, which may reduce friction and increase the ability to transport cuttings to the surface. Polymers can also aid to control fluid leakage into the formation. Suitable examples of polymers may include, but are not limited to, polyethylene, polypropylene, polyvinyl chloride, polystyrene, polyethylene terephthalate, polycarbonate, acrylic, nylon, ethylene vinyl acetate, epoxy resins, polyurethane, styrene-butadiene rubber, silicone, polylactic acid, chitosan, polyacrylamide, cellulose, carboxymethyl cellulose, polyethylene glycol, polyvinyl alcohol, polyaniline, acrylonitrile butadiene styrene, xanthan gum, polyimide, combinations thereof, and the like. In a preferred embodiment, the polymer is XC polymer (xanthan gum).

In some embodiments, the aqueous drilling fluid further includes starch. Starch is a natural polymer and acts as a fluid loss control agent by increasing the viscosity of the fluid, particularly at lower shear rates, which is advantageous for reducing fluid loss into porous structures.

In some embodiments, the aqueous drilling fluid further includes a barite. Barite, or barium sulfate (BaSO$_4$), is a non-toxic and inexpensive compound that is commonly employed as a weight material in aqueous drilling fluids due to its high density and insolubility in water. Barite contributes to the maintenance of hydrostatic pressure by reducing the influx of formation fluids and stabilizing the well bore/subterranean geological formation. Furthermore, barite helps in fluid loss control by forming a filter cake, which lowers fluid loss in permeable materials while inhibiting shale swelling. The weight material is added to the drilling fluid in an amount that is functionally effective, depending on the nature of the formation being drilled. In alternate embodiments, the weight materials may be one of galena (PbS), hematite (Fe$_2$O$_3$), magnetite (Fe$_3$O$_4$), iron oxide (Fe$_2$O$_3$) (manufactured), illmenite (FeO·TiO$_2$), siderite (FeCO$_3$), celestite (SrSO$_4$), dolomite (CaCO$_3$MgCO$_3$), calcite (CaCO$_3$), combinations thereof, and the like.

In some embodiments, the aqueous drilling fluid retains a thermal stability value of 85 to 90%, preferably 85.5 to 89.5%, preferably 86 to 89%, preferably 86.5 to 88.5%, more preferably 87 to 88%, and yet more preferably about 88% at 1000° C. compared to a thermal stability value at 30° C. This suggests a high capacity of the aqueous drilling fluid to withstand degradation and maintain its properties at high temperatures, which is beneficial for WBM.

The AA-Cellulose-NC material is deposited on and binds to an inner surface of the subterranean geological formation to form a hydrophobic filter cake layer to reduce swelling of clay in the subterranean geological formation. This layer inhibits clay swelling inside the geological formation, which helps to stabilize the structure and improves overall drilling performance. The hydrophobic features of the filter cake prevent water absorption, reducing clay degradation and maintaining borehole integrity throughout drilling operations.

In some embodiments, the hydrophobic filter cake layer has a thickness of 0.1 to 50 micrometers (μm), preferably 0.5 to 49 μm, preferably 1 to 48 μm, preferably 2 to 47 μm, preferably 3 to 46 μm, preferably 4 to 45 μm, preferably 5 to 44 μm, preferably 6 to 43 μm, preferably 7 to 42 μm, preferably 8 to 41 μm, preferably 9 to 40 μm, preferably 10 to 39 μm, preferably 11 to 38 μm, preferably 12 to 37 μm, preferably 13 to 36 μm, preferably 14 to 35 μm, preferably 15 to 34 μm, preferably 16 to 33 μm, preferably 17 to 32 μm, preferably 18 to 31 μm, preferably 19 to 30 μm, preferably 20 to 29 μm, preferably 21 to 28 μm, preferably 22 to 27 μm, preferably 23 to 26 μm, and preferably 24 to 25 μm.

In some embodiments, a fluid loss decreases 20 to 30% by volume, preferably 21 to 29% by volume, preferably 22 to 28% by volume, preferably 23 to 27% by volume, and preferably 24 to 26% by volume for the subterranean geological formation contacted with the aqueous drilling fluid compared to a subterranean geological formation contacted with an aqueous fluid that is the same as the aqueous drilling fluid but does not contain the AA-Cellulose-NC material. This decrease is attributed to the ability of AA-Cellulose-NC material to build a stronger, more effective filter cake, which improves fluid loss management and wellbore stability.

In some embodiments, the aqueous drilling fluid has a PV 3 to 4 times, preferably 3.1 to 4.9 times, preferably 3.2 to 4.8 times, preferably 3.3 to 4.7 times, preferably 3.4 to 4.6 times, preferably 3.5 to 4.5 times, preferably 3.6 to 4.4 times, preferably 3.7 to 4.3 times, preferably 3.8 to 4.2 times, and preferably 3.9 to 4.1 times greater than an aqueous fluid that is the same as the aqueous drilling fluid but does not contain the AA-Cellulose-NC material. The higher PV implies that the nanocomposite improves the fluid's rheological properties, making it thicker and more resistant to flow. The AA-Cellulose-NC material facilitates the formation of a stronger gel network, improving fluid loss control and drilling mud stability, which prevents fluid loss in the formation and reduces shale swelling during drilling operations.

In some embodiments, the aqueous drilling fluid has a YP 1.5 to 2.5 times, preferably 1.6 to 2.4 times, preferably 1.7 to 2.3 times, preferably 1.8 to 2.2 times, and preferably 1.9 to 2.1 times greater than an aqueous fluid that is the same as the aqueous drilling fluid but does not contain the AA-Cellulose-NC material.

In some embodiments, the aqueous drilling fluid has a ratio of YP to PV (YP/PV) 0.4 to 0.6 times, preferably 0.41 to 0.59 times, preferably 0.42 to 0.58 times, preferably 0.43 to 0.57 times, preferably 0.44 to 0.56 times, preferably 0.45 to 0.55 times, preferably 0.46 to 0.54 times, preferably 0.47 to 0.53 times, preferably 0.48 to 0.52 times, preferably 0.49 to 0.51 times less than an aqueous fluid that is the same as the aqueous drilling fluid but does not contain the AA-Cellulose-NC material.

In some embodiments, the aqueous drilling fluid has a gel strength at 10 seconds (s) 1.3 to 1.7 times, preferably 1.4 to 1.6 times, and preferably 1.45 to 1.55 times greater than an aqueous fluid that is the same as the aqueous drilling fluid but does not contain the AA-Cellulose-NC material. In some embodiments, the aqueous drilling fluid has a gel strength at 10 min 1.4 to 1.8 times, preferably 1.5 to 1.7 times, and preferably 1.55 to 1.65 times greater than an aqueous fluid that is the same as the aqueous drilling fluid but does not contain the AA-Cellulose-NC material.

In some embodiments, swelling of the clay is reduced by 35 to 60% by volume, preferably 36 to 59% by volume, preferably 37 to 58% by volume, preferably 38 to 57% by volume, preferably 39 to 56% by volume, preferably 40 to 55% by volume, preferably 41 to 54% by volume, preferably 42 to 53% by volume, preferably 43 to 52% by volume, preferably 44 to 51% by volume, preferably 45 to 50% by volume, preferably 46 to 49% by volume, and preferably 47 to 48% by volume compared to the subterranean geological formation contacted with an aqueous fluid that is the same as the aqueous drilling fluid but does not contain the AA-Cellulose-NC material.

In some embodiments, the aqueous drilling fluid includes an AA-Cellulose-NC material in an amount of 0.2 wt. % and swelling of the clay is reduced by 36 to 38%, preferably 36.1 to 37.9%, preferably 36.2 to 37.8%, preferably 36.3 to 37.7%, preferably 36.4 to 37.6%, preferably 36.5 to 37.5%, preferably 36.6 to 37.4%, preferably 36.7 to 37.3%, preferably 36.8 to 37.2%, more preferably 36.9 to 37.1%, and yet more preferably about 37% compared to an aqueous fluid that is the same as the aqueous drilling fluid but does not contain the AA-Cellulose-NC material.

In some embodiments, the aqueous drilling fluid includes an AA-Cellulose-NC material in an amount of 0.5 wt. % and swelling of the clay is reduced by 45 to 48%, preferably 45.1 to 47.9%, preferably 45.2 to 47.8%, preferably 45.3 to 47.7%, preferably 45.4 to 47.6%, preferably 45.5 to 47.5%, preferably 45.6 to 47.4%, preferably 45.7 to 47.3%, preferably 45.8 to 47.2%, preferably 45.9 to 47.1%, preferably 46 to 47%, preferably 46.1 to 46.9%, preferably 46.2 to 46.8%, preferably 46.3 to 46.7%, more preferably 46.4 to 46.6%, and more preferably about 46.5% compared to an aqueous fluid that is the same as the aqueous drilling fluid but does not contain the AA-Cellulose-NC material.

In some embodiments, the aqueous drilling fluid includes an AA-Cellulose-NC material in an amount of 1 wt. % and swelling of the clay is reduced by 55 to 59%, preferably 55.1 to 58.9%, preferably 55.2 to 58.8%, preferably 55.3 to 58.7%, preferably 55.4 to 58.6%, preferably 55.5 to 58.5%, preferably 55.6 to 58.4%, preferably 55.7 to 58.3%, preferably 55.8 to 58.2%, preferably 55.9 to 58.1%, preferably 56 to 58%, preferably 56.1 to 57.9%, preferably 56.2 to 57.8%, preferably 56.3 to 57.7%, preferably 56.4 to 57.6%, preferably 56.5 to 57.5%, preferably 56.6 to 57.4%, preferably 56.7 to 57.3%, preferably 56.8 to 57.2%, more preferably 56.9 to 57.1%, and yet more preferably about 57% compared to an aqueous fluid that is the same as the aqueous drilling fluid but does not contain the AA-Cellulose-NC material. The decrease in swelling is attributed to the ability of nanocomposite to build a protective barrier on clay surfaces, avoiding excessive water absorption and minimizing shale swelling, which aids in wellbore stability during drilling.

FIG. 1 illustrates a flow chart of a method 50 of synthesizing the AA-Cellulose-NC material. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing cellulose, an alkyl polyethylene glycol ether, and ammonium persulfate (APS) in water to form a first solution. Cellulose is a natural polysaccharide consisting of long chains of glucose units connected by β 1,4 glycosidic linkages (bonds). In the formation of AA-Cellulose-NC, cellulose acts as a structural backbone, improving the mechanical characteristics and stability of the material. Its hydroxyl groups enable functionalization with acrylic acid and improve the overall performance of the composite. Furthermore, cellulose promotes water absorption, which aids in the formulation process.

Alkyl polyethylene glycol ether serves as a surfactant and solubilizing agent. It improves the dispersion and compatibility of the components in the aqueous solution, resulting in a homogenous combination. Furthermore, its hydrophilic properties can increase the overall stability and performance of the resultant nanocomposite. Suitable examples of alkyl polyethylene glycol ethers include, but are not limited to, octyl polyethylene glycol ether, dodecyl polyethylene glycol ether, Triton X-100 (octylphenol ethoxylate), coco-polyethylene glycol ether, laureth-4 (lauryl alcohol ethoxylate), Lutensol XL 100, nonylphenol ethoxylate, and the like.

APS serves as an initiator in step 52. It decomposes, releasing free radicals that commence polymerization of acrylic acid onto cellulose, culminating in its functionalization with acrylic acid groups (cellulose diacrylate). APS may also assist oxidize carbon nanoparticles (CNPs), enhancing their dispersion and interaction with the cellulose matrix, resulting in the development of a stable carbon nanocomposite material.

The water may be tap water, distilled water, double-distilled water, deionized water, deionized distilled water, reverse osmosis water, and/or some other water. In a preferred embodiment, the water is double-distilled water. The reactants may be mixed manually or with the help of a stirrer to form a first solution.

At step 54, the method 50 includes mixing acrylic acid, methyl methacrylate, and 2-ethyl hexyl acrylate with the first solution to form a second solution. These acrylate monomers will undergo co-polymerization, which will be initiated by free radicals produced by ammonium persulfate, further functionalizing the cellulose diacrylate. Acrylic acid adds more reactive groups, methyl methacrylate adds stiffness, and 2-ethyl hexyl acrylate adds flexibility to the composite. This mixture forms a crosslinked polymer network, increasing mechanical strength, flexibility, and overall performance, as well as strengthening its interaction with CNPs in the final nanocomposite structure. The mixing may be carried out manually or with the help of a stirrer.

At step 56, the method 50 includes heating the second solution to a temperature of 80 to 90° C., preferably 81 to 89° C., preferably 82 to 88° C., preferably 83 to 87° C., more preferably 84 to 86° C., and yet more preferably about 85° C. for 20 to 40 minutes (min), preferably 21 to 39 min, preferably 22 to 38 min, preferably 23 to 37 min, preferably 24 to 36 min, preferably 25 to 35 min, preferably 26 to 34 min, preferably 27 to 33 min, preferably 28 to 32 min, more preferably 29 to 31 min, and yet more preferably about 30 min.

At step 58, the method 50 includes adding CNPs to the second solution to form a third solution. These NPs improve mechanical properties of composite, increase electrical conductivity, thermal stability, and provide more surface area for improved interaction with a polymer matrix. CNPs can also aid in nanocomposite production by increasing the dispersion and bonding of polymerized acrylates and the cellulose matrix.

The CNPs may exist in various morphological shapes, such as nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, a combination thereof, and the like. Suitable examples of CNPs include carbon nanotubes (CNTs), graphene oxide (GO), graphene, carbon black, fullerenes ($C_{60}$, $C_{70}$), carbon nanofibers (CNFs), activated CNPs, carbon aerogels, carbon nanorods, mesoporous CNPs, vapor-grown carbon fibers (VGCF), amorphous CNPs, and any carbon nanoparticles known in the art. In some embodiments, the CNPs are obtained from a millet carbon soot. In alternate embodiments, the CNPs may be obtained from thermal activation of biomass, carbonization of organic precursors, and/or exfoliation of graphite.

At step 60, the method 50 includes sonicating the third solution. Sonication of the third solution helps to disperse CNPs homogeneously throughout the matrix by breaking up agglomerates, resulting in greater interaction with the polymer.

At step 62, the method 50 includes heating the third solution to a temperature of 80 to 90° C., preferably 81 to 89° C., preferably 82 to 88° C., preferably 83 to 87° C., more preferably 84 to 86° C., and yet more preferably about 85° C. for 50 to 70 min, preferably 51 to 69 min, preferably 52 to 68 min, preferably 53 to 67 min, preferably 54 to 66 min, preferably 55 to 65 min, preferably 56 to 64 min, preferably 57 to 63 min, preferably 58 to 62 min, more preferably 59 to 61 min, and yet more preferably about 60 min to form the AA-Cellulose-NC material. In a preferred embodiment, the third solution is heated to a temperature of 85° C. for 60 min.

EXAMPLES

The following examples describe and demonstrate a method for clay swelling inhibition using acrylic acid functionalized cellulose diacrylate carbon nanocomposite (AA-Cellulose-NC). The examples are provided solely for illustration and are not to be construed as limitations of the present disclosure, as many variations thereof are possible without departing from the spirit and scope of the present disclosure.

Example 1: Materials

The chemicals used in the present disclosure were: acrylic acid (94%), methyl methacrylate (MMA) (analytical grade), 2-ethyl hexyl acrylate (2-EHA) (99%), cellulose (98%), Lutensol XL100 ($RO(CH_2CH_2O)XH$ $R=C_{10}H_{21}$), which is a type of alkyl polyethylene glycol ether, and ammonium persulfate (APS) (99%) from BASF. Carbon nanoparticles (CNPs) were obtained from millet carbon soot. The sodium bentonite (Na-Ben) clay was obtained from Sigma Aldrich to study the inhibitive effect of the modified water-based mud (WBM). Deionized water was used for the preparation of all WBM samples.

Example 2: Synthesis of AA-Cellulose-NC

Figure 2:
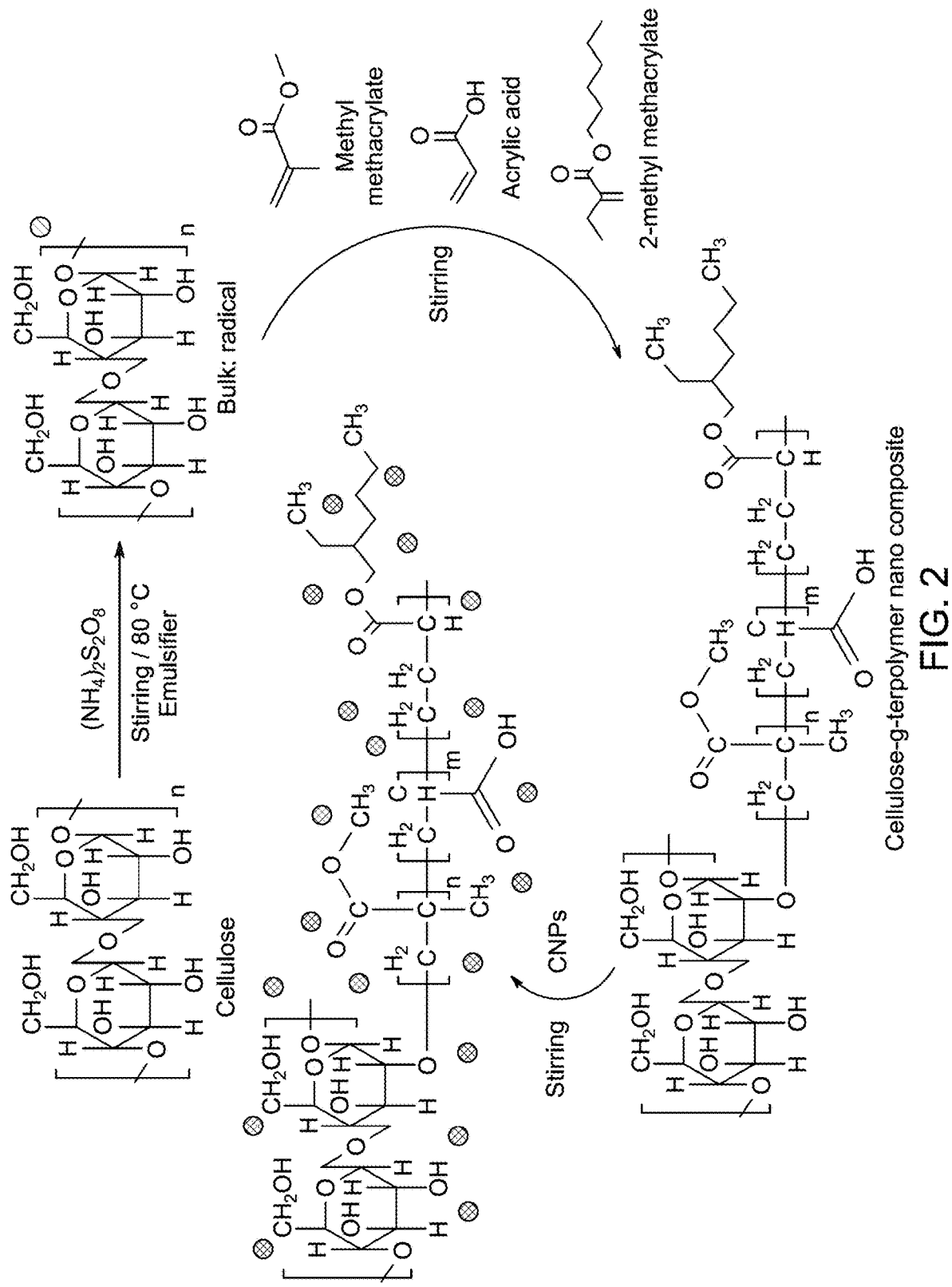
FIG. 2 is a schematic diagram for the synthesis of biodegradable terpolymer, according to certain embodiments.

AA-Cellulose-NC was synthesized by using a previously reported method [Nadeem, S. et al., Acrylic Acid-Functionalized Cellulose Diacrylate-Carbon Nanocomposite Thin Film: Preparation, Characterization, and Applications, *JOM*, 2022, 74, 2113-2119, which is incorporated herein by reference in its entirety). FIG. 2 is a schematic diagram representing the synthesis method of AA-Cellulose-NC. Cellulose-g-terpolymer (MMA, 2-EHA, AA) was synthesized using a free radical polymerization method. Briefly, 0.01 gram (g) of cellulose was dispersed in 50 milliliters (mL) of double-distilled water, in a double-neck round-bottom flask. The mixture was continuously stirred gently for 15 minutes (min). Lutensol XL100 (1 mL) and 0.1 g of the initiator (APS) were added to the cellulose suspension. Afterward, 25 mL of the mixture of monomers (8.0 mL MMA, 8.0 mL of AA, and 9.0 mL of 2-EHA) was added at a rate of 1.5 milliliters per minute (mL/min). The temperature was allowed to increase up to 85 degrees Celsius (° C.) and kept constant for 90 min. The NPs (0.005 g) were added for half an hour after the addition of the mixture of monomers and ultrasonicated to achieve a homogenous nanocomposite.

Example 3: Preparation of Drilling Fluid

The WBMs were synthesized for a study of various rheological and swelling inhibition features. The base mud (BM) was obtained by mixing additives listed in Table 1. Mixing of WBM and the AA-Cellulose-NC modified WBMs was done by vigorous stirring for 30 min to get the homogenized WBM samples. The pH of the WBMs was maintained at around 9 by adding sodium hydroxide (NaOH).

TABLE 1

The composition of water-based muds with and without shale inhibitor

| Formulation | Mixing time (min) | Unmodified drilling mud (WBM) | Modified drilling mud |
|---|---|---|---|
| Water | — | 350 mL | 350 mL |
| Bentonite | 20 | 10 g | 10 g |
| NaOH | 5 | 0.2 g | 0.2 g |
| XC polymer | 20 | 0.5 g | 0.5 g |
| Starch | 10 | 0.4 g | 0.4 g |
| Barite | 10 | 50 g | 50 g |
| AA-Cellulose-NC | 10 | — | 1 g |

Example 4: Material Characterization

High-resolution scanning electron microscope (HR-SEM) Helios focused ion beam scanning electron microscopy (FIBSEM) was used to analyze the surface characteristics, size, and shape of clay particles. Fourier-transform infrared (FTIR) spectroscopy (Thermo-Scientific (Waltham, Massachusetts, USA)) was utilized to study the functional groups shown in the shale samples. The FTIR spectrum was observed between 500-4000 $cm^{-1}$. Anhydrous KBr and a sample were mixed at a weight ratio of 100:1 and pressed to get a semitransparent disc for FTIR analysis. Thermogravimetric analysis (TGA) was conducted using SDT Q 600, TA Instruments, New Castle, USA, to study the thermal stability of the material at high temperatures. The samples were heated up to 800° C. at increments of 10 degrees Celsius per minute (° C./min) under a nitrogen environment and a weight reduction was recorded.

Example 5: Rheological and Swelling Inhibition Study

Dispersion stability of the AA-Cellulose-NC was studied in different concentrations of salts and at different pH values. Visual investigation for the stability of the AA-Cellulose-NC solution was recorded for up to 24 hours (h) [Ma, L. et al., Dispersion Stability of Graphene Oxide in Extreme Environments and Its Applications in Shale Exploitation, *ACS Sustain. Chem. Eng.*, 2022, 10, 2609-2623, which is incorporated herein by reference in its entirety]. The American petroleum institute (API) field testing procedures (API-13B) were used for the detailed analysis of the rheology of WBMs (American Petroleum Institute, 2019, which is incorporated herein by reference in entirety). The rheology assessment was performed at 49° C. by using a TA rheometer. The low pressure, low temperature (LPLT) API filter press (FANN series 300) was utilized to measure the amount of fluid loss of WBMs. 350 mL of WBM was added to the filter press at room temperature. A pressure of 100 pounds per square inch (psi) was applied to the WBM and a filtrate was collected in a graduated cylinder at intervals of up to 30 min. The swelling inhibition capacity of the AA-Cellulose-NC was investigated by a linear swelling test employing a dynamic linear swell meter (OFITE, Inc, Houston, USA). Initially, Na-Ben powder was pressed at 6000 psi by a hydraulic press to obtain the Na-Ben pellet. Then, the Na-Ben pellet was exposed to the different aqueous solutions and the linear expansion was observed for 24 h. The results obtained from AA-Cellulose-NC were compared with water.

Practical inhibitory properties of the WBMs were investigated using a capillary suction time (CST) test, conducted with an OF testing equipment (OFITE) CST instrument. An objective of this test is to assess the time needed by the filtrate to move from one set of electrodes to another through a filter media. The CST test was used for the assessment of the base mud (BM) and AA-Cellulose-NC samples. The BM sample was prepared by mixing 2.0 wt. % Na-Ben in distilled water. The AA-Cellulose-NC was prepared by adding 0.5 g AA-Cellulose-NC to 2.0 wt. % Na-Ben respectively. 5.0 mL WBM was added to the CST apparatus fitted with a filter medium at the bottom, and the time was recorded for the liquid to reach the external electrode.

Figure 3A:
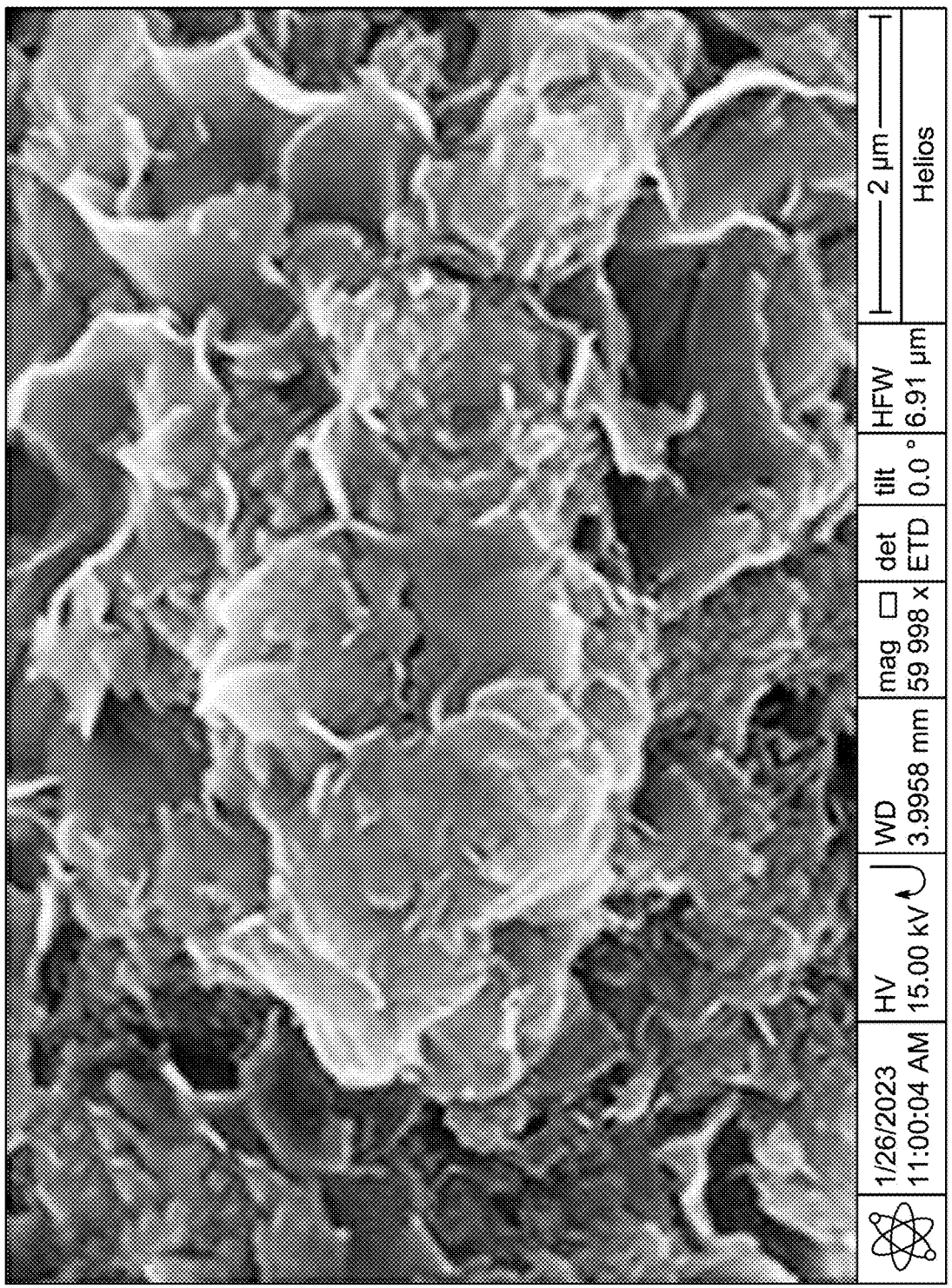
FIG. 3A depicts a scanning electron microscope (SEM) image of sodium bentonite (Na-Ben), according to certain embodiments.
Figure 3B:
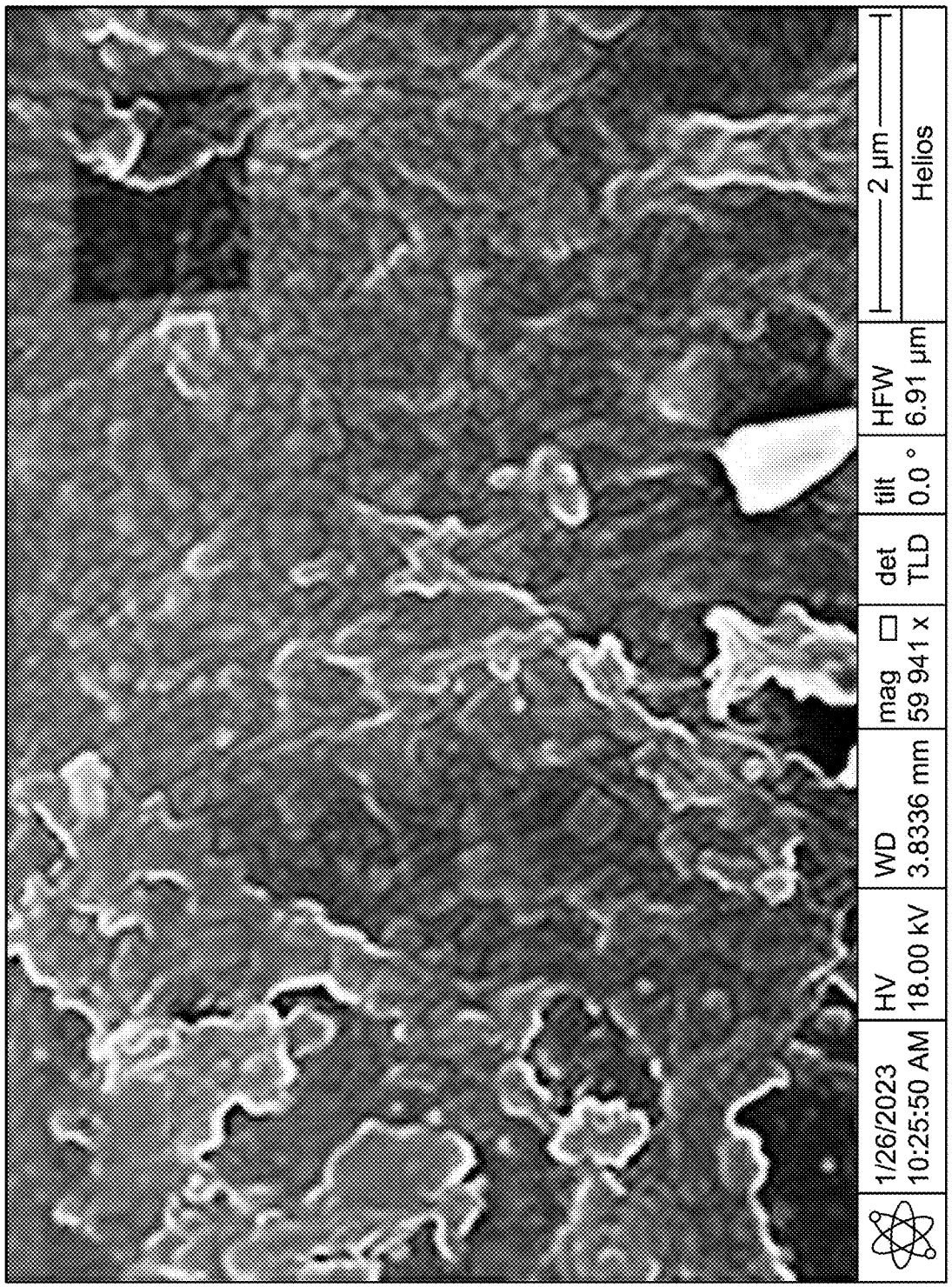
FIG. 3B depicts an SEM image of AA-Cellulose-NC, according to certain embodiments.
Figure 3C:
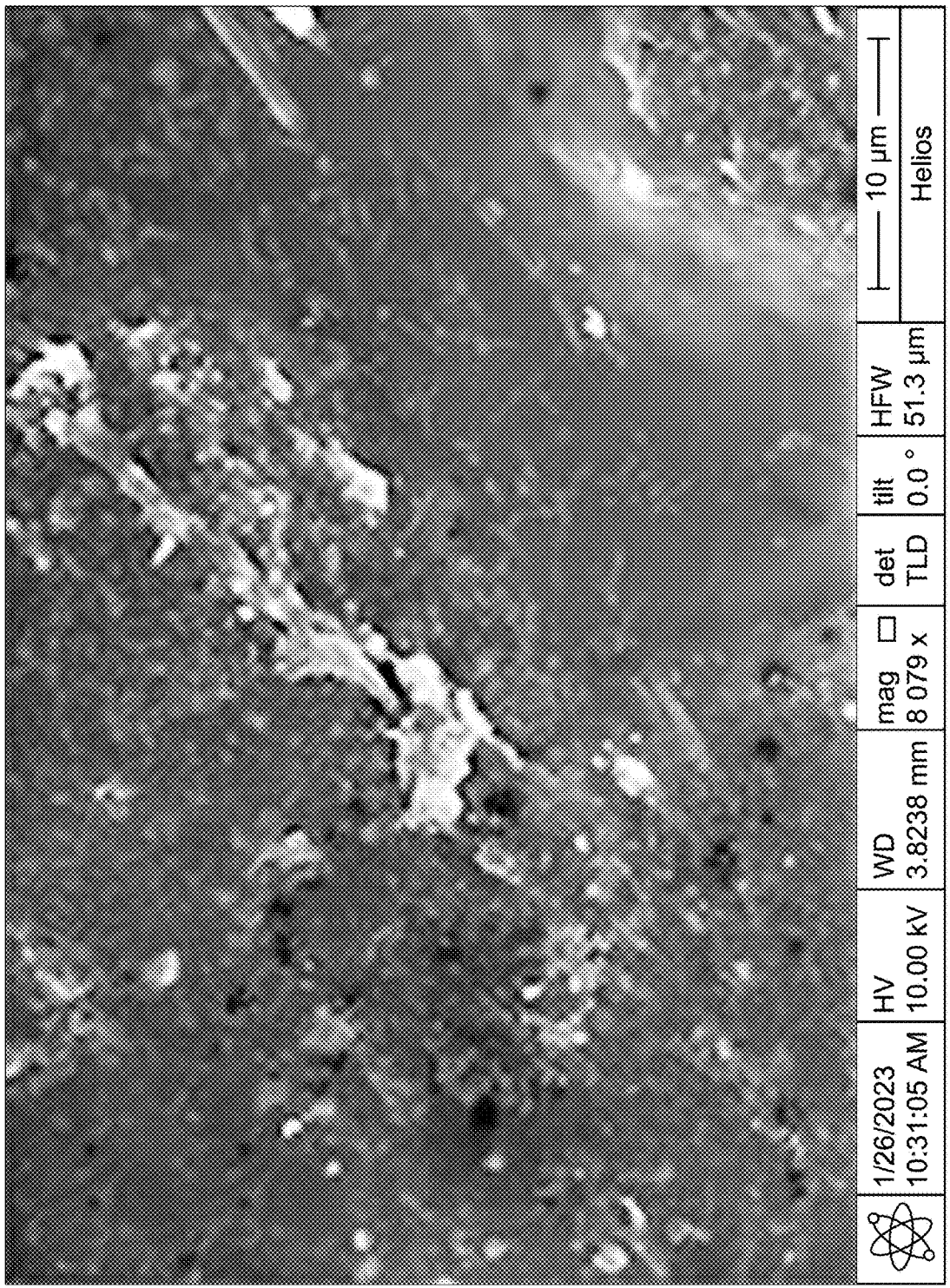
FIG. 3C depicts an SEM image of AA-Cellulose-NC modified base mud (BM) filter cake, according to certain embodiments.

The SEM images of the base mud (BM), AA-Cellulose-NC, and BM modified with AA-Cellulose-NC are shown in FIGS. 3A-3C. Na-Ben has the capacity to tightly bind to the water and cause clay hydration and swelling. It can be observed in FIG. 3A that BM exposed to water displayed a rough structure with visible pores on the surface (FIG. 3A). The AA-Cellulose-NC exhibits a smooth exterior with less structural deformities (FIG. 3B) than the BM. Mixing of AA-Cellulose-NC with Na-Ben also changes the features of the filter cake and demonstrates the formation of a protective coating of AA-Cellulose-NC on the surface of Na-Ben (FIG. 3C). A smooth exterior with fewer nanopores can be observed in FIG. 3C.

Figure 4:
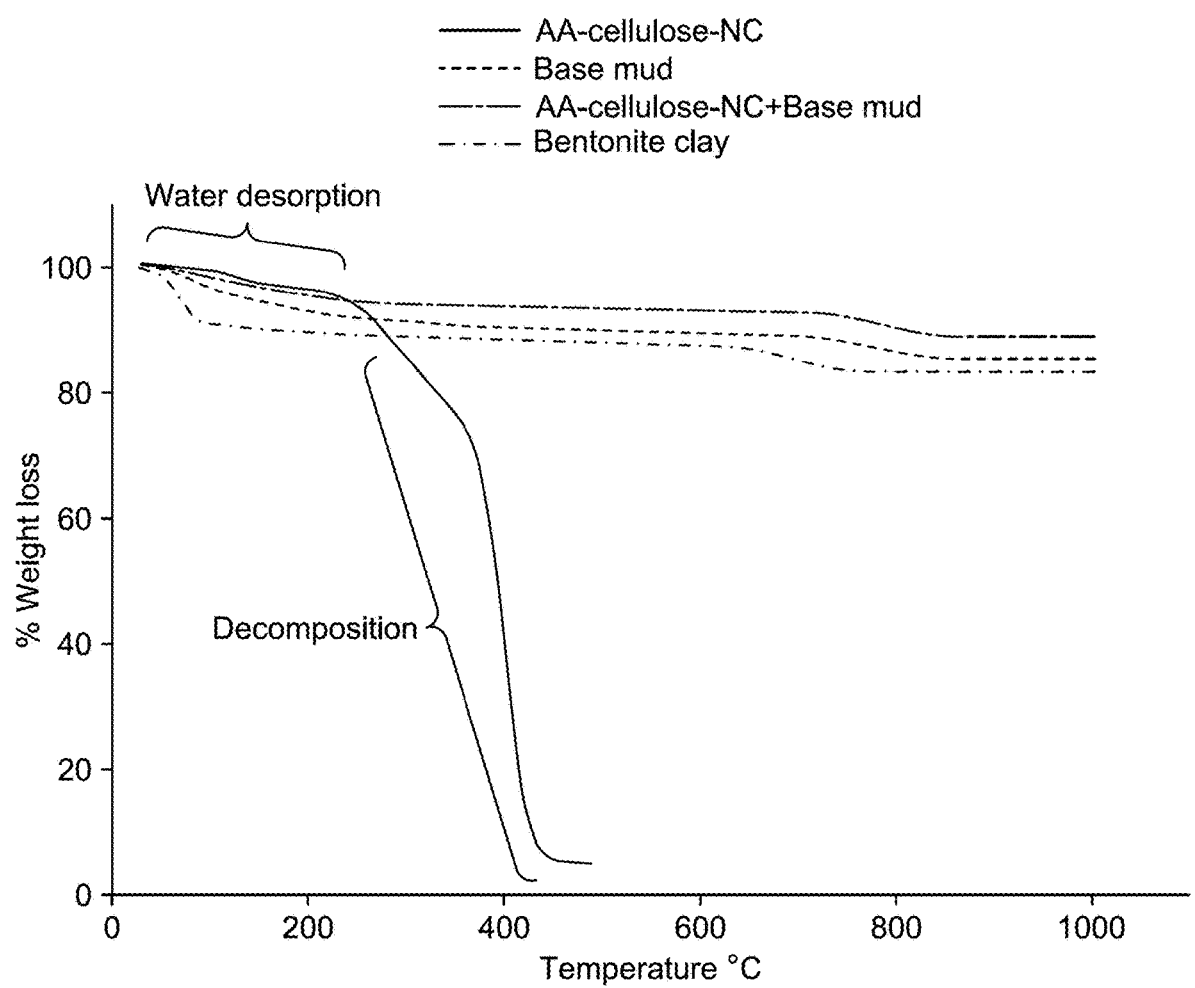
FIG. 4 is a thermogravimetric analysis (TGA) plot of Na-Ben, AA-Cellulose-NC, BM, and AA-Cellulose-NC modified BM, according to certain embodiments.

Thermogravimetric analysis (TGA) provides details about the thermal stability of the material of present disclosure. FIG. 4 demonstrates the TGA analysis of BM, AA-Cellulose-NC, and the BM modified with 1.0 wt. % of AA-Cellulose-NC. Dehydration or desorption of residual water occurs at temperature of 30 to 230° C., resulting in a weight loss of about 5.0%. Desorption of the hydrogen-bonded water with polysaccharides occurred [Nadeem, S. et al., Acrylic Acid-Functionalized Cellulose Diacrylate-Carbon Nanocomposite Thin Film: Preparation, Characterization, and Applications, *JOM*, 2022, 74, 2113-2119, which is incorporated herein by reference in its entirety]. For AA-Cellulose-NC, the first major weight loss of 20-25% occurs between 230-350° C. The major plunge in the weight of AA-Cellulose-NC indicates the decomposition of polymer structure. The next weight loss for the AA-Cellulose-NC was observed between 350-450° C., which was accredited to the degradation of residual polymers. A total of 5.0 wt. % of the AA-Cellulose-NC was obtained as the final residue at 500° C. The bentonite clay and BM showed better stability than the AA-Cellulose-NC, and a total of 17% and 15% mass loss, respectively, occurs until a temperature of 1000° C. The mass loss of bentonite clay and the BM may be accredited to the desorption of water. Mixing of AA-Cellulose-NC with BM results in a behavioral change where the TGA of the mixture demonstrated improved thermal stability. 88.6% of residue was obtained from the 1.0% AA-Cellulose-NC and BM mixture at a temperature of 1000° C.

Figure 5:
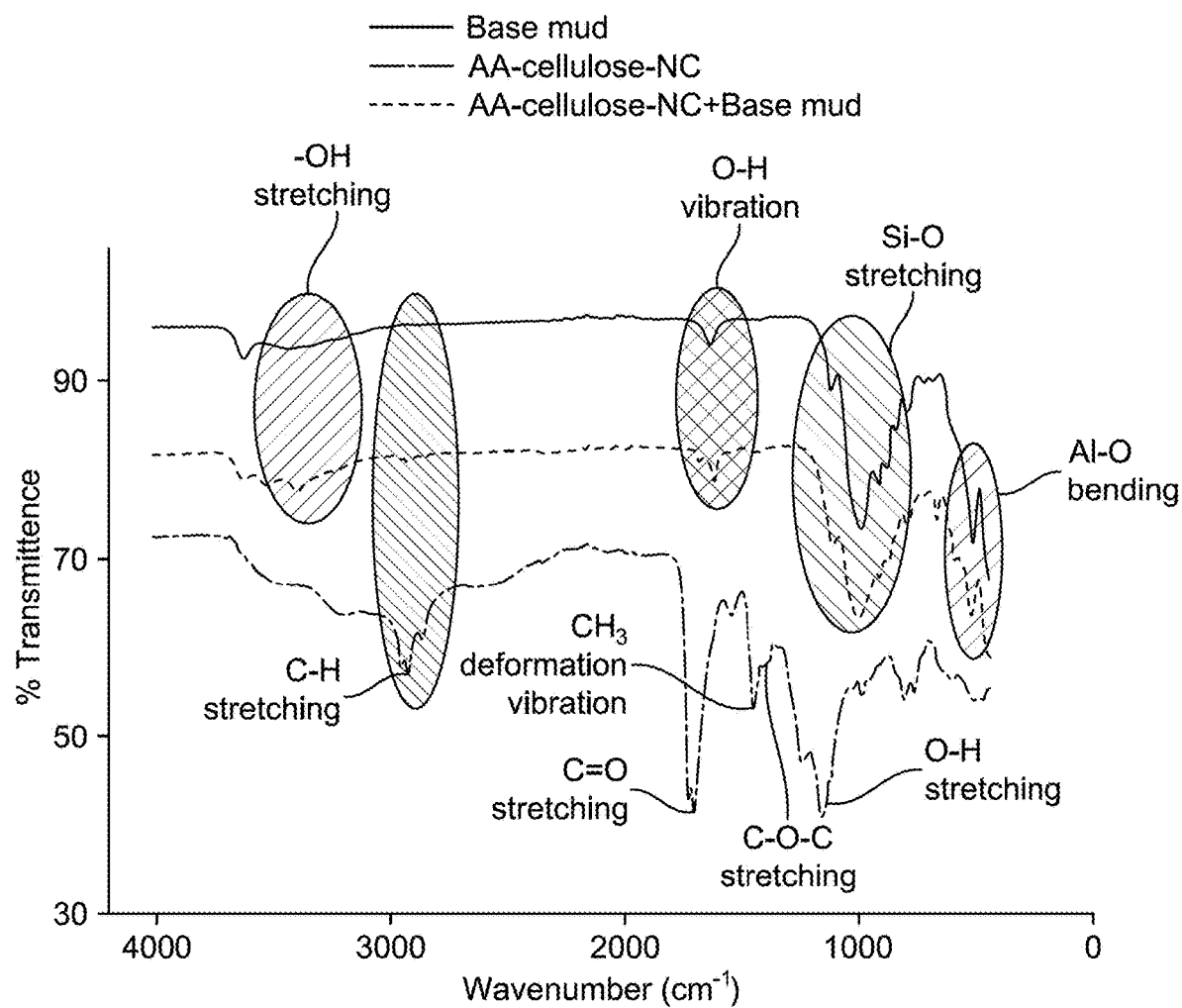
FIG. 5 depicts Fourier-transform infrared (FTIR) spectra for BM, AA-Cellulose-NC, and AA-Cellulose-NC modified BM, according to certain embodiments.

FIG. 5 depicts the FTIR spectra of BM, AA-Cellulose-NC, and AA-Cellulose-NC modified BM. FTIR demonstrates bonding vibrations of functional groups attached to the surface of samples. The BM is composed of Na-Ben clay which is made up of aluminosilicates. —OH stretching could be observed at 3616 $cm^{-1}$ and 3363 $cm^{-1}$, which is indicative of the hydrophilic nature of the BM and its water adsorption capacity [Louati, S. et al., Geopolymers Based on Phosphoric Acid and Illito-Kaolinitic Clay, *Adv. Mater. Sci. Eng.*, 2016, 1-7, which is incorporated herein by reference in its entirety]. The absorption band at 1622 $cm^{-1}$ is an angular vibration of the O—H group of water. The absorption band at 2926 $cm^{-1}$ indicates C—H stretching. Two strong absorption bands at 988 cm$^{-1}$ and 469 cm$^{-1}$ demonstrate Si—O stretching and Al—O bending, respectively. The FTIR spectrum of AA-Cellulose-NC demonstrates a CH stretching peak at 2933 cm$^{-1}$. A strong peak validating the presence of C=O bonds appears at 1704 cm$^{-1}$. The absorption band at the 1450 cm$^{-1}$ is accredited to the CH$_3$ deformational vibration. The stretching of ether bond arises with an absorption band at 1389 cm$^{-1}$. The strong absorption band that appears at 1162 cm$^{-1}$ is accredited to O—H stretching. Modification of Na-Ben with the AA-Cellulose-NC causes a prominent variation in surface functionalities of the Na-Ben. The absorption bands at 3363 cm$^{-1}$ and 1622 cm$^{-1}$ related to the —OH group display a decrease in absorption. The decrease in —OH bands intensity may be accredited to the formation of a protective coating and a blocking of pores of the Na-Ben by AA-Cellulose-NC. The Si—O band also shows a decrease in signal as an indication of strong hydrogen bonding between —OH groups of AA-Cellulose-NC and silanol on the Na-Ben clay surface [De Bussetti, S. G. and Ferreiro, E. A., Adsorption of Poly(Vinyl Alcohol) on Montmorillonite, *Clays Clay Miner,* 2004, 52, 334-340, which is incorporated herein by reference in its entirety]. The FTIR data support that the introduction of AA-Cellulose-NC to the BM improves the adsorption of AA-Cellulose-NC due to hydrogen bonding, and the Na-Ben surface is protected against the reactive action of water.

Analyzing the rheological properties provides information about the shale inhibitor. Plastic viscosity (PV) is utilized to measure the resistance of drilling fluid flow. Usually, a drilling fluid with a high PV is not suitable for the drilling operation due to the difficulty in pumping [Bayat, A. E. et al., Experimental investigation of rheological and filtration properties of water-based drilling fluids in presence of various nanoparticles, *Colloids Surfaces A Physicochem. Eng. Asp.,* 2018, 555, 256-263, which is incorporated herein by reference in its entirety] however, according to the specification mentioned by API, the workable range of PV of a drilling fluid is 8-35 cp [Kar, Y. et al., Environmentally Friendly Dispersants for HP/HT Aqueous Drilling Fluids Containing Mn3O4, Contaminated With Cement, Rock Salt, and Clay, *SPE Middle East Oil and Gas Show and Conference,* 2011, which is incorporated herein by reference in its entirety].

Table 2 lists rheological properties at 75 degrees Fahrenheit (° F.) and 14.7 psi. The addition of 1.0 wt. % AA-Cellulose-NC to the drilling fluid causes an increase of PV from 8.4 to 28.0 centipoise (cp). The increase in PV may be accredited to the strong network formation between the AA-Cellulose-NC and the BM. The network is formed due to the strong hydrogen bonding between the —OH groups present on the AA-Cellulose-NC and bentonite surface [Bhattacharyya, R., and Ray, S. K., Micro- and nano-sized bentonite filled composite superabsorbents of chitosan and acrylic copolymer for removal of synthetic dyes from water, *Appl. Clay Sci.,* 2014, 101, 510-520, which is incorporated herein by reference in its entirety].

TABLE 2

| | Rheological properties at 75° F. and 14.7 psi | | | | | |
|---|---|---|---|---|---|---|
| Mud formulation | PV (cp) | YP (lb/ft$^2$) | YP/PV (Pa/mPa·s) | Gel$_{10\,s}$ (lb/ft$^2$) | Gel$_{10\,min}$ (lb/ft$^2$) | Fluid loss (mL) |
| Unmodified BM | 8.4 | 7.5 | 0.89 | 2.6 | 3.7 | 10 |
| AA-Cellulose-NC Modified BM | 28 | 15.6 | 0.55 | 4 | 6 | 7.4 |
| % change in rheological features after addition of AA-Cellulose-NC | 233.0% increase | 108.0% increase | 38.2% decrease | 53.8% increase | 62.1% increase | 26.0% decrease |

Yield point (YP), measured in pounds per square foot (lb/ft$^2$), is influenced by both the friction within the fluid and the interparticle forces in colloidal suspensions of WBMs. When drilling fluids have a higher YP, it can lead to partial flocculation and clogging in the drilling system. Conversely, a decrease in YP can indicate a reduction in the flocculation of the drilling fluid [Dias, F. T. G. et al., Influence of modified starches composition on their performance as fluid loss additives in invert-emulsion drilling fluids, *Fuel,* 2015, 140, 711-716, which is incorporated herein by reference in its entirety]; therefore, very high or very low YP is not desirable. The addition of 1.0 wt. % AA-Cellulose-NC to BM are within the specification of API for the drilling fluids. The YP/PV ratio is a measurement of shear-thinning that is used assess the pumping pressure and well cleaning capacity of drilling fluids [Rana, A. et al., Nanosilica modified with moringa extracts to get an efficient and cost-effective shale inhibitor in water-based drilling muds, *Chem. Eng. Process.—Process Intensif.,* 2021, 168, 108589, which is incorporated herein by reference in its entirety]. There is a direct relation between the shear thinning and the YP/PV ratio. The calculation of YP/PV in Table 2 suggests that the unmodified BM sample after has a high YP/PV value, therefore high pumping pressure would be required to move mud through pipes, and it would make the pipe cleaning process very difficult. The literature demonstrates that the YP/PV ratio should be about 0.375 (Pa/mPa·s) to attain adequate cleaning [Avci, E. and Mert, B. A., The Rheology and Performance of Geothermal Spring Water-Based Drilling Fluids, wGeofluids, 2019, 1-8; Luo, Z. et al., Influence of an ionic liquid on rheological and filtration properties of water-based drilling fluids at high temperatures, *Appl. Clay Sci.,* 2017, 136, 96-102; and Ofei, T. N. et al., Insight into ionic liquid as potential drilling mud additive for high temperature wells, *J. Mol. Liq.,* 2017, 242, 931-939, which are incorporated herein by references in their entireties]. It can be seen from Table 2 that the ratio of YP/PV decreases after the addition of AA-Cellulose-NC. The gel strength was used as an indication of attractive forces within the WBM under no-flow conditions. Addition of nanocomposite increases the Gel$_{10s}$ and Gel$_{10min}$ due to an increase in attractive forces. The addition of AA-Cellulose-NC to BM enhances the rheology of the drilling fluid.

Figure 6:
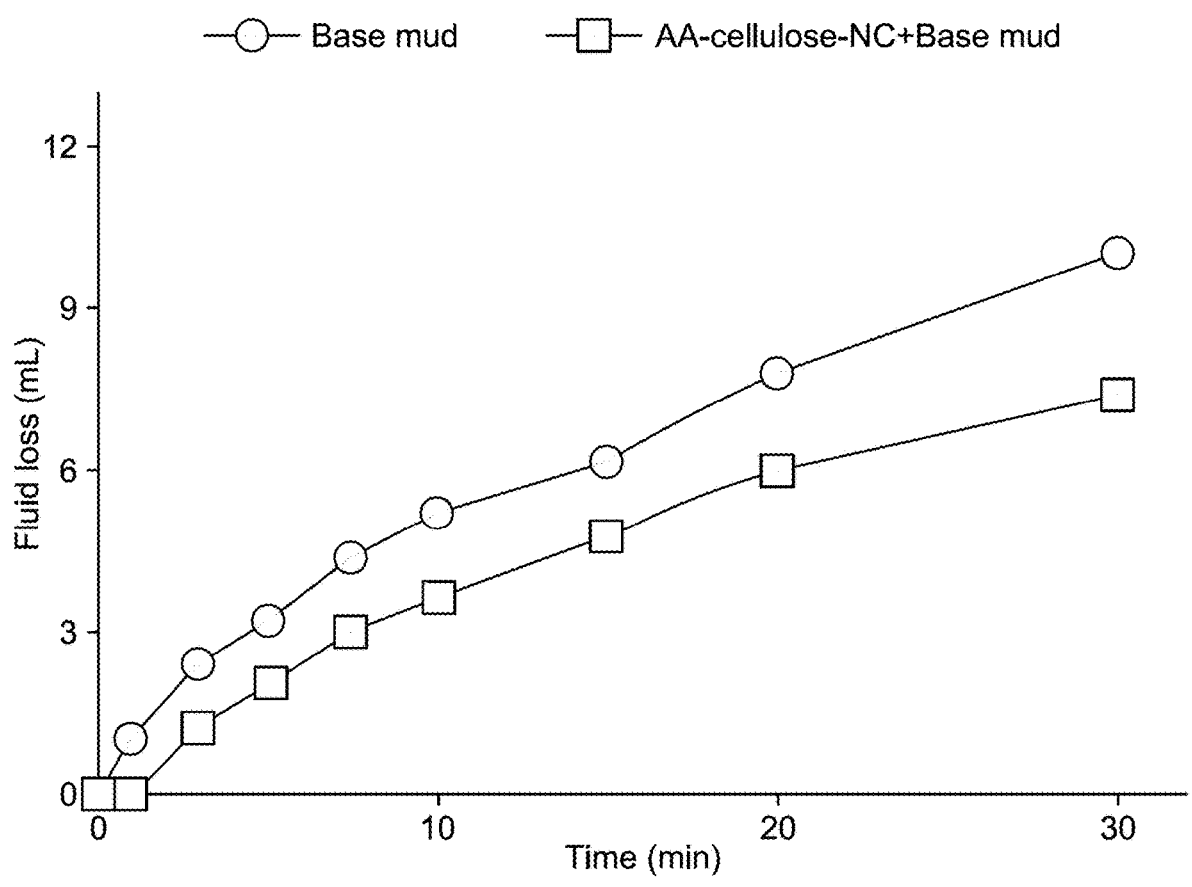
FIG. 6 is a fluid loss analysis plot of BM and AA-Cellulose-NC modified BM, according to certain embodiments.

Fluid loss characteristics of the AA-Cellulose-NC modified BM was assessed by API filter press. FIG. 6 is a plot depicting fluid loss analysis of BM and AA-Cellulose-NC modified BM. Filtration behavior of drilling fluids is helpful in determining rheological features of WBMs. The BM demonstrated high fluid loss of 10.0 mL. After addition of 1.0 wt. % AA-Cellulose-NC, a 26.0% decrease was observed in the fluid loss. The decrease of fluid loss of AA-Cellulose-NC modified BM could be accredited to formation of a compact film that blocks the nanopores and hinders water invasion [Saleh, T. A. et al., Hydrophobic polymer-modified nanosilica as effective shale inhibitor for water-based drilling mud, *J. Pet. Sci. Eng.*, 2022, 209, 109868, which is incorporated herein by reference in its entirety].

Figure 7:
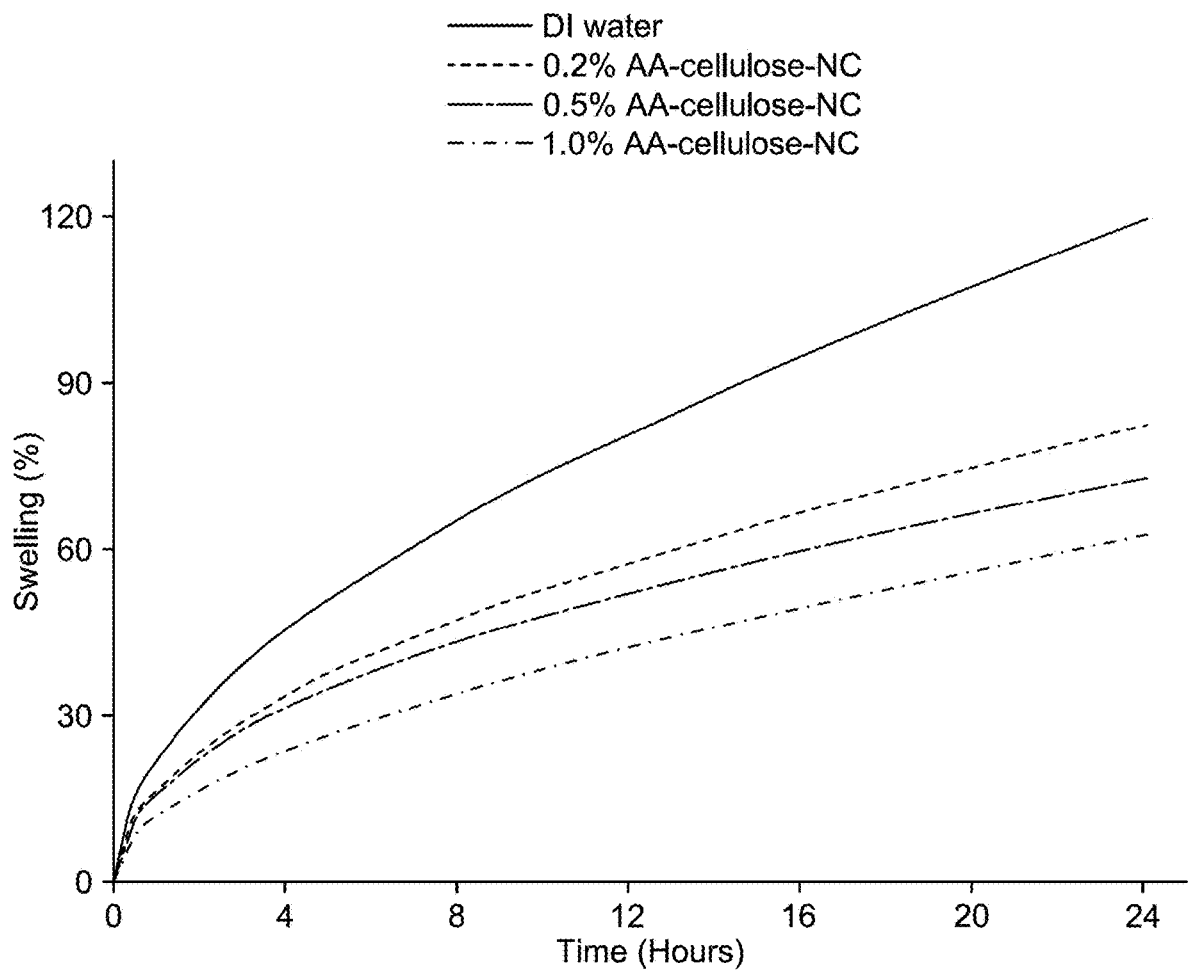
FIG. 7 is a plot depicting linear expansion of bentonite clay in the presence of water and different concentrations of inhibition media comprising AA-Cellulose-NC, according to certain embodiments.
Figure 8:
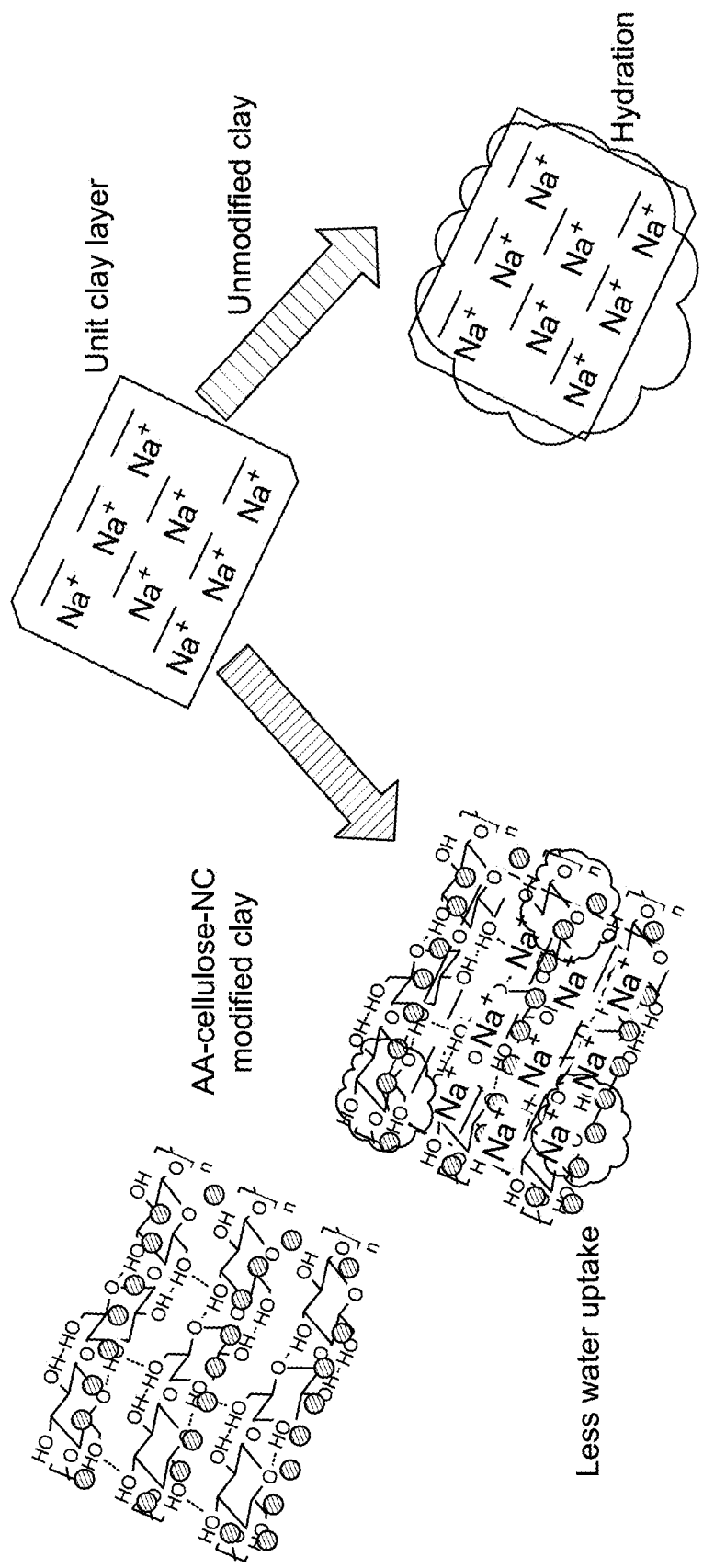
FIG. 8 is a schematic representation of an inhibition mechanism by AA-Cellulose-NC, according to certain embodiments.
Figure 8:
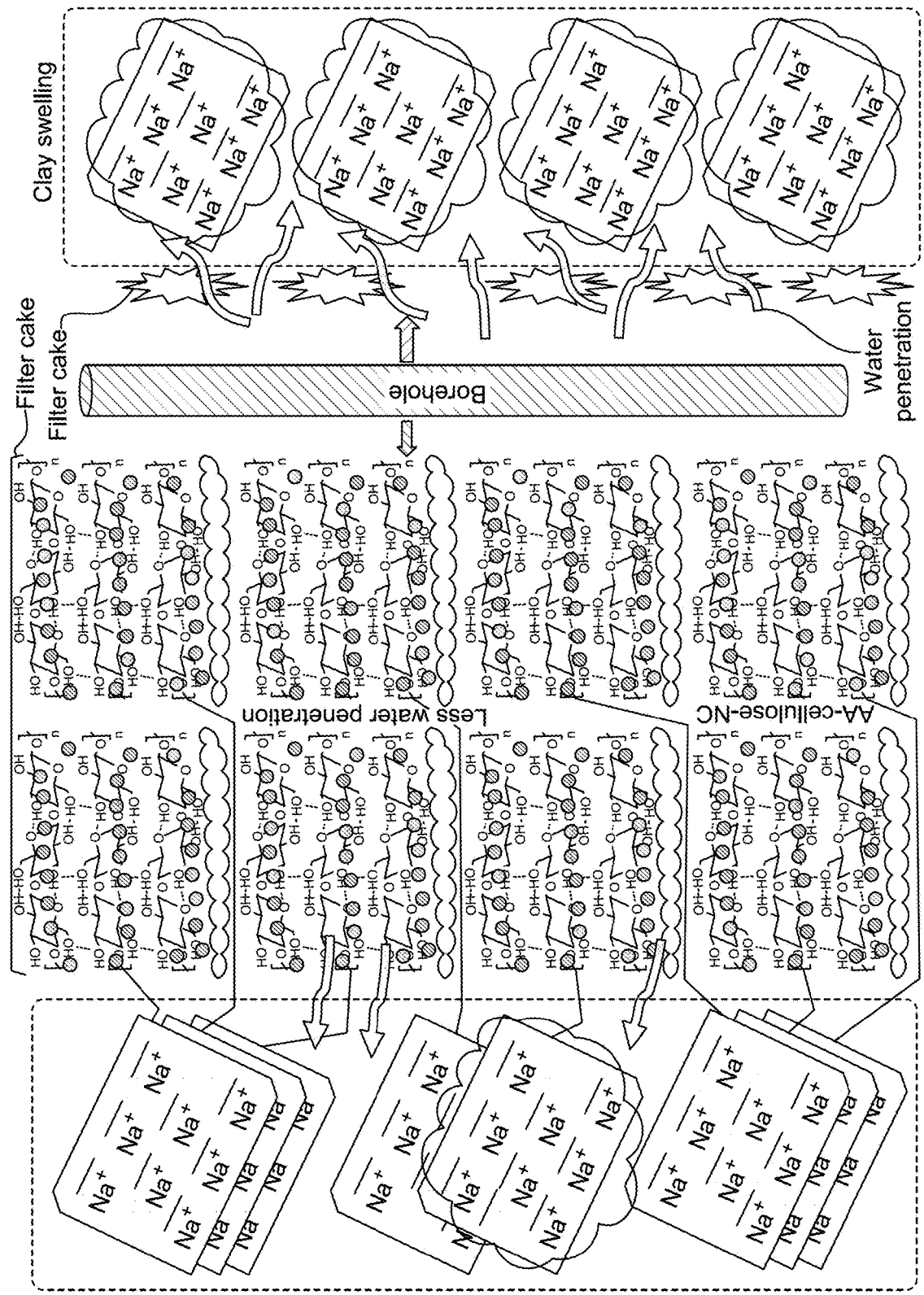

FIG. 7 is a plot depicting linear swelling test results of Na-Ben in the presence of water and different concentrations of inhibition media. The clay displayed the highest swelling in the presence of deionized water (119.24%). The addition of 0.2 wt. % AA-Cellulose-NC reduced the swelling by 37.02%, compared to water. An increase in the concentration of AA-Cellulose-NC to 0.5 wt. % further reduced the linear expansion by 10.4% compared to 0.2 wt. % AA-Cellulose-NC and 46.63% compared to water. When the concentration of AA-Cellulose-NC was increased to 1.0 wt. %, the bentonite pellet displayed the highest reduction in swelling with a decrease of 56.8%, 19.74%, and 10.71% compared to water, 0.2 wt. % AA-Cellulose-NC, and 0.5 wt. % AA-Cellulose-NC, respectively. The reduction in the swelling is an indication of the strong binding of AA-Cellulose-NC with the clay. The linear swelling test supports the inhibitory performance of AA-Cellulose-NC that varied by varying the concentration of nanocomposites. FIG. 8 depicts a schematic representation of the inhibition mechanism by AA-Cellulose-NC.

Comprehensive characterization using advanced techniques, along with the assessment of rheological and swelling inhibition features, supports that AA-Cellulose-NC strongly binds to clay surfaces. Thorough characterization, rheological analysis, and swelling inhibition assessments demonstrates that AA-Cellulose-NC has the ability to protect bentonite clay from degradation caused by water. A surface film by AA-Cellulose-NC was formed for inhibiting clay swelling. The AA-Cellulose-NC contained functionalities that helped bind to the clay surface and form a protective coating that made the surface hydrophobic. As a result, the hydrophilic clay surface became more water-resistant due to the protective coating of AA-Cellulose-NC.

Expansion of shale formations during oil drilling processes can lead to borehole instability. Efficient clay swelling inhibitors can help limit shale expansion during drilling processes. The inhibitory performance of AA-Cellulose-NC was assessed for fluid loss control and clay swelling inhibition by employing a linear swelling test, rheological analysis, and a fluid loss control test. The outcomes of the linear swelling test depict suppression of swelling after the addition of AA-Cellulose-NC to the Na-Ben mud. An AA-Cellulose-NC amount of 0.2 wt. %, 0.5 wt. %, and 1.0 wt. % in a water-based mud reduced the linear swelling to 82.18%, 72.61%, and 62.44%, respectively, compared to 119.50% swelling in water. AA-Cellulose-NC also resulted in a suppression of fluid loss by 26.0% after the addition of 1.0 wt. % AA-Cellulose-NC to water-based mud. The ability of AA-Cellulose-NC to block the nanopores and hinder water invasion to the Na-Ben surface played a role in controlling linear swelling and fluid loss. Application of AA-Cellulose-NC as a drilling fluid additive can lead to cost savings, a reduction in non-productive time, and help reduce the environmental impact of drilling processes.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of clay swelling inhibition, comprising:
   contacting an aqueous drilling fluid with a subterranean geological formation,
   wherein the aqueous drilling fluid comprises an acrylic acid functionalized cellulose diacrylate carbon nanocomposite material in an amount of 0.1 to 2 percent by weight (wt. %) of the aqueous drilling fluid,
   wherein the acrylic acid functionalized cellulose diacrylate carbon nanocomposite material is formed by reacting cellulose with acrylic acid, methyl methacrylate, and 2-ethyl hexyl acrylate then sonicating with carbon nanoparticles (CNPs);
   wherein the acrylic acid functionalized cellulose diacrylate carbon nanocomposite material is deposited on and binds to an inner surface of the subterranean geological formation to form a hydrophobic filter cake layer to reduce swelling of clay in the subterranean geological formation.

2. The method of claim 1, wherein swelling of the clay is reduced by 35 to 60% by volume compared to the subterranean geological formation contacted with an aqueous fluid that is the same as the aqueous drilling fluid but does not contain the acrylic acid functionalized cellulose diacrylate carbon nanocomposite material.

3. The method of claim 1, wherein a fluid loss decreases 20 to 30% by volume compared to the subterranean geological formation contacted with an aqueous fluid that is the same as the aqueous drilling fluid but does not contain the acrylic acid functionalized cellulose diacrylate carbon nanocomposite material.

4. The method of claim 1, wherein the aqueous drilling fluid further comprises a bentonite, a base, a polymer, a starch, and a barite.

5. The method of claim 4, wherein the bentonite is a sodium bentonite.

6. The method of claim 1, wherein the aqueous drilling fluid has a plastic viscosity 3 to 4 times greater than an aqueous fluid that is the same as the aqueous drilling fluid but does not contain the acrylic acid functionalized cellulose diacrylate carbon nanocomposite material.

7. The method of claim 1, wherein the aqueous drilling fluid comprises an acrylic acid functionalized cellulose diacrylate carbon nanocomposite material in an amount of 0.2 wt. % and swelling of the clay is reduced by 36 to 38% compared to an aqueous fluid that is the same as the aqueous drilling fluid but does not contain the acrylic acid functionalized cellulose diacrylate carbon nanocomposite material.

8. The method of claim 1, wherein the aqueous drilling fluid comprises an acrylic acid functionalized cellulose diacrylate carbon nanocomposite material in an amount of 0.5 wt. % and swelling of the clay is reduced by 45 to 48% compared to an aqueous fluid that is the same as the aqueous drilling fluid but does not contain the acrylic acid functionalized cellulose diacrylate carbon nanocomposite material.

9. The method of claim 1, wherein the aqueous drilling fluid comprises an acrylic acid functionalized cellulose diacrylate carbon nanocomposite material in an amount of 1 wt. % and swelling of the clay is reduced by 55 to 59% compared to an aqueous fluid that is the same as the aqueous drilling fluid but does not contain the acrylic acid functionalized cellulose diacrylate carbon nanocomposite material.

10. The method of claim 1, wherein the acrylic acid functionalized cellulose diacrylate carbon nanocomposite material is made by a process, comprising:

mixing cellulose, an alkyl polyethylene glycol ether, and ammonium persulfate in water to form a first solution;

mixing acrylic acid, methyl methacrylate, and 2-ethyl hexyl acrylate with the first solution to form a second solution;

heating the second solution to a temperature of 80 to 90° C. for 20 to 40 minutes (min);

adding carbon nanoparticles to the second solution to form a third solution;

sonicating the third solution; and heating the third solution to a temperature of 80 to 90° C. for 500 to 70 min to form the acrylic acid functionalized cellulose diacrylate carbon nanocomposite material.

11. The method of claim 1, wherein the carbon nanoparticles are obtained from a millet carbon soot.

12. The method of claim 4, wherein the aqueous drilling fluid retains a thermal stability value of 85 to 90% at 1000° C. compared to a thermal stability value at 30° C.

13. The method of claim 1, wherein the aqueous drilling fluid has a yield point 1.5 to 2.5 times greater than an aqueous fluid that is the same as the aqueous drilling fluid but does not contain the acrylic acid functionalized cellulose diacrylate carbon nanocomposite material.

14. The method of claim 1, wherein the aqueous drilling fluid has a ratio of yield point to plastic viscosity (YP/PV) 0.4 to 0.6 times less than an aqueous fluid that is the same as the aqueous drilling fluid but does not contain the acrylic acid functionalized cellulose diacrylate carbon nanocomposite material.

15. The method of claim 1, wherein the aqueous drilling fluid has a gel strength at 10 seconds 1.3 to 1.7 times greater than an aqueous fluid that is the same as the aqueous drilling fluid but does not contain the acrylic acid functionalized cellulose diacrylate carbon nanocomposite material.

16. The method of claim 1, wherein the aqueous drilling fluid has a gel strength at 10 min 1.4 to 1.8 times greater than an aqueous fluid that is the same as the aqueous drilling fluid but does not contain the acrylic acid functionalized cellulose diacrylate carbon nanocomposite material.

17. The method of claim 1, wherein the contacting occurs at a temperature of 70 to 80° C.

18. The method of claim 1, wherein the hydrophobic filter cake layer has a thickness of 0.1 to 50 μm.

19. The method of claim 4, wherein a mass ratio of the bentonite to the acrylic acid functionalized cellulose diacrylate carbon nanocomposite material is from 5:1 to 55:1.

\* \* \* \* \*